C. JENSEN.
STATION INDICATOR.

No. 188,915. Patented March 27, 1877.

2 Sheets—Sheet 2.

Witnesses:
C. Clarence Poole
Will H. Moxon

Inventor:
Conrad Jensen
per atty. A. H. Evans & Co.
Washington D.C.

UNITED STATES PATENT OFFICE.

CONRAD JENSEN, OF BOSTON, MASSACHUSETTS.

IMPROVEMENT IN STATION-INDICATORS.

Specification forming part of Letters Patent No. 188,915, dated March 27, 1877; application filed March 20, 1877.

*To all whom it may concern:*

Be it known that I, CONRAD JENSEN, of Boston, Massachusetts, have invented a new and useful Improvement in Station-Indicators, of which the following is a clear, full, and exact description, reference being had to the accompanying drawings, making a part of this specification, in which—

Figure 1:
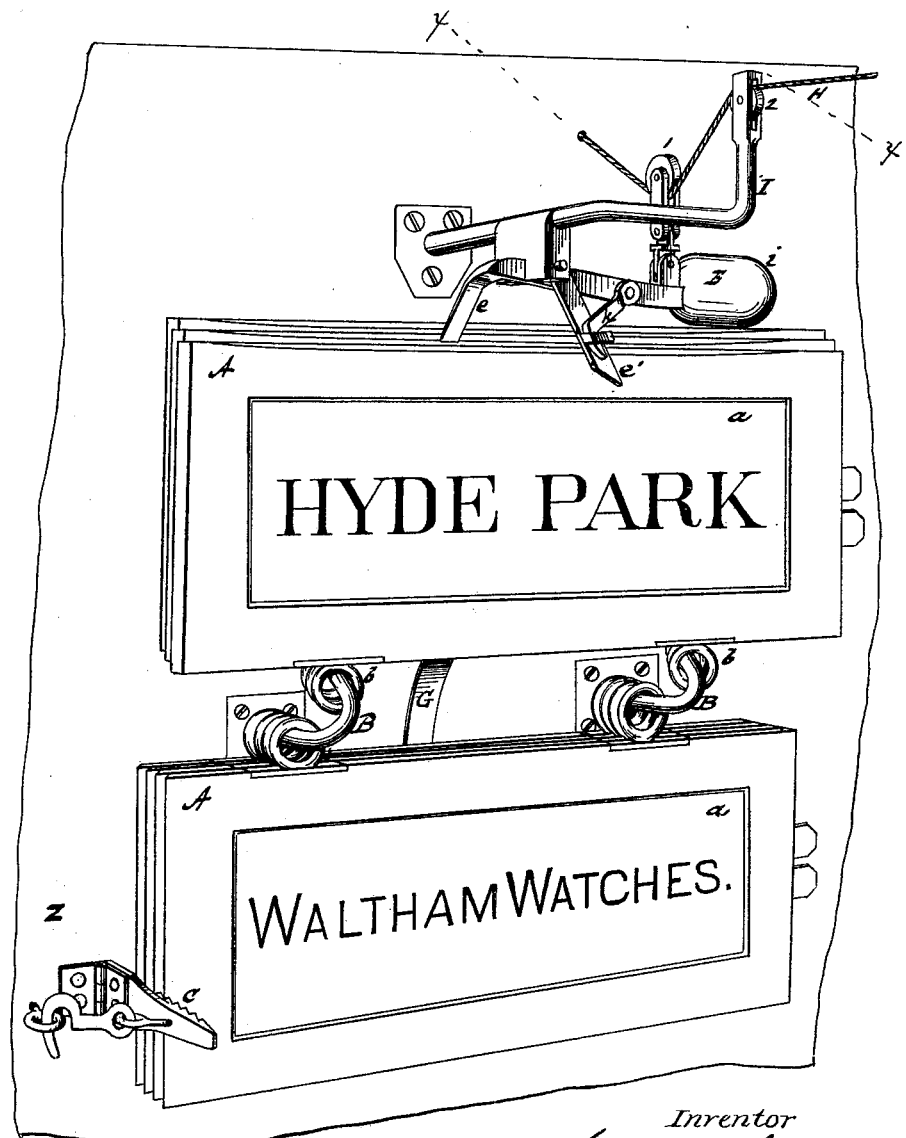
Figure 2:
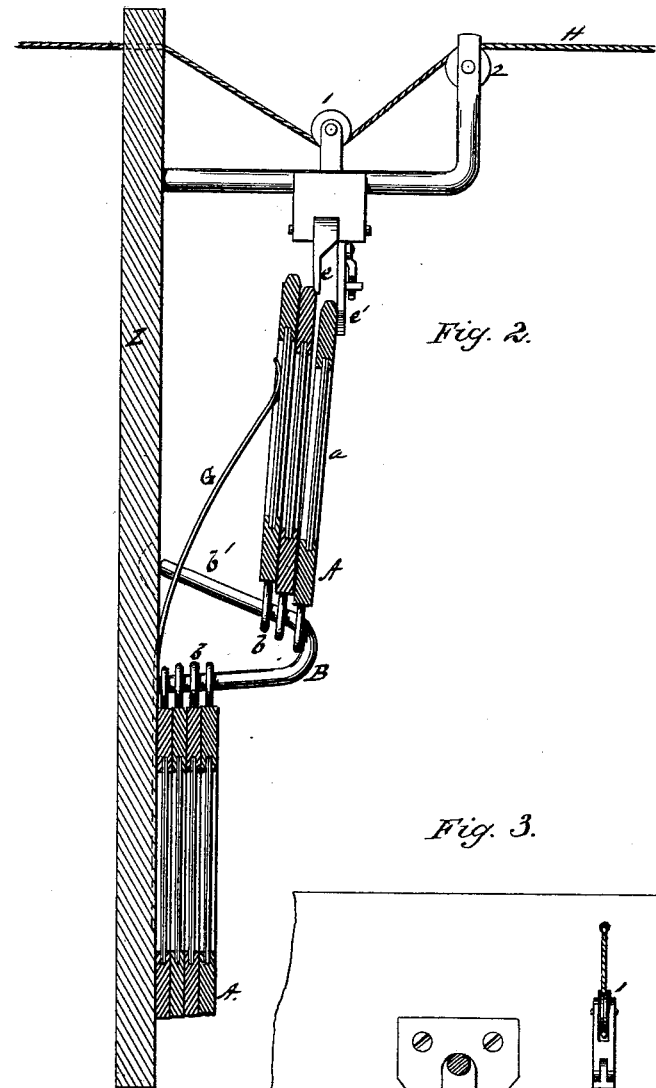
Figure 3:
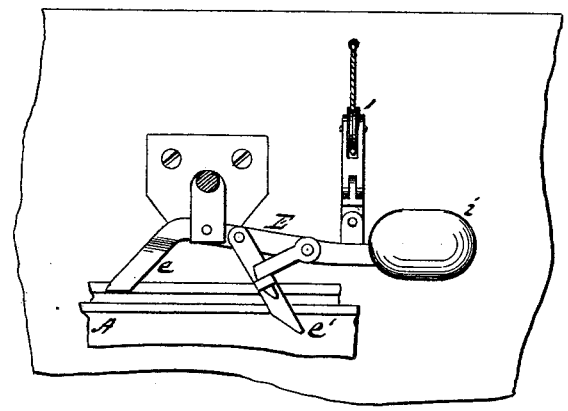

Figure 1 is a perspective view of my device. Fig. 2 is a section through $x\ x$ of Fig. 1. Fig. 3 represents the operating mechanism.

My invention relates to that class of station-indicators which are placed inside of the railway-cars; and it consists in the several combinations of devices hereinafter described and claimed.

To enable others to make and use my invention, I will proceed to describe the exact manner in which I have carried it out.

In the drawings, A A represent frames holding the slides $a\ a$, and provided with the eyes $b\ b$, through which pass the bent bars B, having the backwardly-inclined open end $b'$. As these frames are allowed to drop from the inclined portion $b'$ of the bars they are caught and held by the toothed bar C, hinged to the plate Z. This prevents the frames from rattling when the train is in motion. On these frames A A are printed, painted, or otherwise affixed the names of the stations along the route to be traveled. Each frame contains the name of a station, and as that station is passed, the frame is allowed to fall to the lower position, presenting the opposite side of that frame, and allowing the next frame to be seen, on which is the name of the next station to be reached. I am aware, however, that the changing of the plates so as to present the names of different stations is not new; and this I do not claim as my invention. On the opposite sides of the frames may be printed advertisements, or any other words or letters desired. The arrangement, however, affords a convenient advertising medium.

The peculiar incline and bend of the bars B allows the frames A A to pass readily to the front and over the bend to the horizontal portion below. The ends $b'$ being open, and not touching the rear plate, the eyes $b\ b$ are easily passed over them, and the frames placed in position. The frames may be constructed with the slides $a\ a$, for containing the names of the stations, or the frames may be made solid, without departing from the spirit of my invention.

When the frames are in position they are held and operated by means of a cord, H, passing through the train, and attached, in each car, to a weighted lever-catch, E, provided with a fixed arm, $e$, and a pivoted arm, $e'$, the latter being somewhat longer than the former. This catch is pivoted to the arm I, attached to the rear plate at a convenient point above the frames A A. The outer end of the lever is weighted at $i$; and when the weight is down the arm $e'$ holds the frames in a vertical position on the inclined portion $b'$ of the bent bars B. When the weighted end is raised by means of the cord H the front or exposed frame is allowed to fall over the bent portion of the bar B, when it is caught and held by the toothed bar C below, the arm $e$ at the same time catching the next frame as the weight is raised, and preventing any movement of the frames in the rear of the front or exposed one. As the weighted end of the catch E is again allowed to descend, and with it the arm $e'$, the arm $e$ is raised just sufficiently to permit the next frame to pass it and rest against the arm $e'$, ready to be dropped when the station indicated thereon has been passed.

One of these devices is to be placed in the front of each car, and it is evident that, by means of a connecting-cord passing through the train, the conductor can simultaneously change the indicator as desired from his position in any car on the train. The weighted lever-catch E is easily raised or lowered by means of the cord H, passing through the sheaves 1 and 2. The longer arm $e'$ of the catch E is pivoted and held in position by a hook-catch, $k$, or any other convenient means. By this means the arm $e'$ may be moved out of the way while the frames A A are being placed in position behind it. In the rear of the frames, and attached to the rear plate, I secure the spring G, by which the plates are kept pressed forward against the arm $e'$, ready to be dropped when desired.

Having thus explained my invention, what I claim as new, and desire to secure by Letters Patent, is—

1. The frames A A, provided with the eyes $b\ b$, in combination with the bent bars B, having the backwardly-inclined open ends $b'$, substantially as and for the purpose set forth.

2. The frames A A, provided with the eyes $b\ b$ and the bent bars B, in combination with the hinged toothed bar C, substantially as and for the purpose set forth.

3. The frames A A and bars B, in combination with the weighted catch E, provided with the fixed arm $e$ and pivoted arm $e'$, substantially as and for the purpose set forth.

4. The weighted catch E, provided with the arms $e\ e'$, in combination with the frame or arm I, sheaves 1 and 2, and the cord H, substantially as and for the purpose set forth.

5. The weighted lever-catch E, provided with the arms $e\ e'$ and frames A A, in combination with the hinged catch C, spring G, and bent bars B, substantially as and for the purpose set forth.

CONRAD JENSEN.

Witnesses:
MICHAEL J. MOSS,
G. B. RICHARDS.